(12) United States Patent
Fukui et al.

(10) Patent No.: US 12,497,030 B2
(45) Date of Patent: Dec. 16, 2025

(54) DRIVING ASSIST APPARATUS

(71) Applicant: TOYOTA JIDOSHA KABUSHIKI KAISHA, Toyota (JP)

(72) Inventors: Yusuke Fukui, Toyota (JP); Tsunekazu Yasoshima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 436 days.

(21) Appl. No.: 17/974,128

(22) Filed: Oct. 26, 2022

(65) Prior Publication Data

US 2023/0278546 A1    Sep. 7, 2023

(30) Foreign Application Priority Data

Mar. 2, 2022 (JP) .................................. 2022-031523

(51) Int. Cl.
 B60W 30/09 (2012.01)
(52) U.S. Cl.
 CPC ..... B60W 30/09 (2013.01); *B60W 2554/4041* (2020.02); *B60W 2554/4042* (2020.02); *B60W 2554/4044* (2020.02)
(58) Field of Classification Search
 CPC ..... B60W 2552/30; B60W 2554/4041; B60W 2554/4042; B60W 2554/4044; B60W 2554/80; B60W 2554/804; B60W 2554/806; B60W 30/09; B60W 30/0956; B60W 40/076
 See application file for complete search history.

(56) References Cited

U.S. PATENT DOCUMENTS

| | | | |
|---|---|---|---|
| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2015/0291159 | A1* | 10/2015 | Sasabuchi ............. G01S 13/867 701/1 |
| 2016/0155329 | A1 | 6/2016 | Goto et al. |
| 2016/0284218 | A1 | 9/2016 | Ejiri |

(Continued)

FOREIGN PATENT DOCUMENTS

| | | |
|---|---|---|
| JP | 2015-99469 A | 5/2015 |
| JP | 2016-110218 A | 6/2016 |

(Continued)

*Primary Examiner* — Madison R. Inserra
(74) *Attorney, Agent, or Firm* — Sughrue Mion, PLLC

(57) ABSTRACT

In a driving assist apparatus, front side object information that is information about a front side object existing in front of a self-vehicle and front lateral side object information that is information about a front lateral side object existing in a lateral side with respect to a running direction of the self-vehicle are acquired, and a moving course of the front lateral side object is judged to be a grade separation course which is away from a moving course of the self-vehicle in a vertical direction and does not intersect with the moving course of the self-vehicle course and the front lateral side object is not judged to be a collision risk object when a positional relation between the front side object and the front lateral side object fulfills a predetermined condition, based on the front side object information and the front lateral side object information.

11 Claims, 11 Drawing Sheets

(56) References Cited

U.S. PATENT DOCUMENTS

| | | |
|---|---|---|
| 2016/0339909 A1 | 11/2016 | Matsunaga et al. |
| 2019/0005821 A1* | 1/2019 | Matsunaga ............ G01S 13/931 |
| 2019/0066491 A1 | 2/2019 | Okubo |
| 2019/0212169 A1 | 7/2019 | Yamamoto et al. |
| 2020/0118435 A1* | 4/2020 | Goto ................. G08G 1/096716 |
| 2021/0009120 A1* | 1/2021 | Hamada ............. B60W 30/0956 |
| 2021/0061309 A1 | 3/2021 | Kawanai |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2023/0215273 A1* | 7/2023 | Yamauchi ............... G06V 20/64 |

FOREIGN PATENT DOCUMENTS

| | | |
|---|---|---|
| JP | 2016-218629 A | 12/2016 |
| JP | 2018-24338 A | 2/2018 |
| JP | 2018-36114 A | 3/2018 |
| JP | 2018-119985 A | 8/2018 |
| JP | 2019-40436 A | 3/2019 |

* cited by examiner

FIG. 12
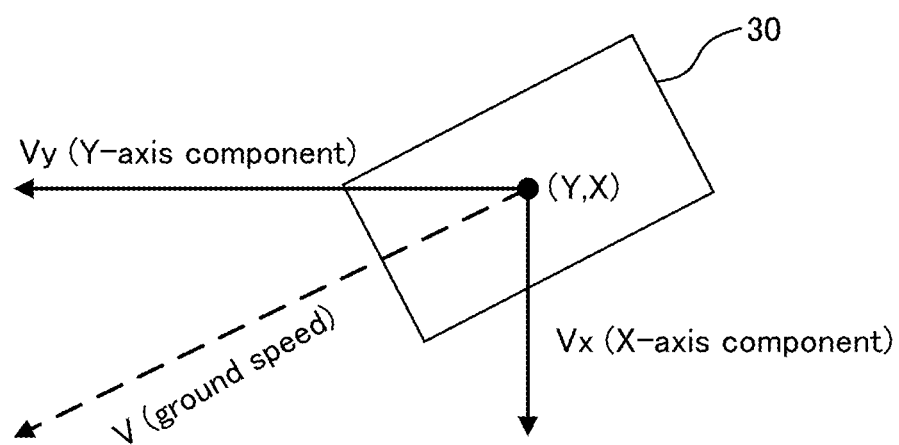
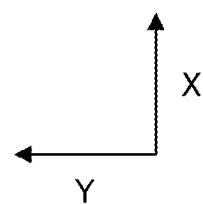

DRIVING ASSIST APPARATUS

TECHNICAL FIELD

The present invention relates to a driving assist apparatus. More specifically, the present invention relates to a driving assist apparatus that can exclude an object with a low possibility of colliding with a self-vehicle among objects, which are detected by a front lateral side radar and moving to a front side of the self-vehicle from a front lateral side of the self-vehicle, from being a target of a collision avoidance assist to reduce a frequency that an unnecessary collision avoidance assist is performed.

BACKGROUND ART

In the art, a driving assist apparatus which detects an object existing around a self-vehicle and performs assist for avoiding a collision of the object and the self-vehicle (which may be referred to as "collision avoidance assist" hereafter) when a possibility that the object and the self-vehicle may collide with each other is judged to be high has been known. Furthermore, in such driving assist apparatus, a technology for reducing a frequency that an unnecessary collision avoidance assist is performed by excluding an object which will not collide with the self-vehicle in fact, such as an object located above the self-vehicle (which may be referred to as an "upper object" hereafter), from being a target of a collision avoidance assist has been known.

For example, a vehicle control device disclosed in the Patent Document 1 (PTL1) comprises a radar system which detects an object in front of a self-vehicle, a predetermined control execution part which carries out predetermined control for reducing a possibility of a collision with the object in front of the self-vehicle when there is possibility of the collision, and an inhibition part which inhibits the predetermined control on the object closer to the self-vehicle among a first object and a second object on condition that the radar system simultaneously detects the first object and the second object at different distances and a difference between a lateral position of the first object and a lateral position of the second object in a transverse direction on the basis of a running direction of the self-vehicle is smaller than a predetermined value. In accordance with the device, it is possible to reduce a possibility that predetermined control for reducing the possibility of a collision may be carried out for an object which is detected by a radar system and can be passed through.

Moreover, in a radar system disclosed in the Patent Document 2 (PTL2), an object data derivation part derives object data according to an object based on a received signal acquired by receiving a reflected wave from the object every fixed time period, and an upper object judging part judges that the object is an upper object when the object is a stationary object whose object data appeared newly and another vehicle exists within a predetermined distance in front of the object. In accordance with the system, it is possible to judge whether an object according to object data which appeared newly is an upper object or not with high accuracy.

Both the above-mentioned conventional technologies judge whether a possibility that an object detected by a front side radar and a self-vehicle may collide with each other is high or not. However, since a field angle of a front side radar is narrow, it is difficult to detect an object approaching a self-vehicle from a lateral side, for example at a crossing, etc., at an early stage. Therefore, in these days, a radar which detects an object existing in front lateral sides (right front and left front) of a self-vehicle (which may be referred to as a "front lateral side radar" hereafter) has been introduced, for the purpose of detecting an object approaching a self-vehicle from a lateral side at an early stage, etc.

FIG. 1 is a schematic view for showing a situation where another vehicle is approaching a self-vehicle comprising a front side radar and a front lateral side radar from a lateral side. In FIG. 1, hatching with vertical stripes is given to a region F where an object can be detected by a front side radar (not shown) which a self-vehicle 10 comprises, and hatching with horizontal stripes is given to a region S where an object can be detected by a front lateral side radar (not shown) which the self-vehicle 10 comprises. As a result, hatching with a lattice is given to a range in which the region F and the region S overlap each other. Since a field angle of a front side radar is narrow as shown by the region F, it is difficult for the front side radar to detect another vehicle 30 approaching the self-vehicle 10 from a lateral side, at an early stage. However, the another vehicle 30 can be detected at an early stage by introducing the front lateral side radar which has a large field angle toward a front lateral side of the self-vehicle 10 as shown by the region S. As shown in FIG. 1, in the present specification, a running direction of a self-vehicle is a positive direction of an X-axis, and a direction to a left side from a right side of the self-vehicle is a positive direction of a Y-axis. Moreover, although not shown, a position of the self-vehicle is an origin.

It becomes possible to perform a collision avoidance assist more certainly by introducing a front lateral side radar as mentioned above. On the other hand, since the number of objects detected as the objects existing around the self-vehicle increases, it is becoming increasingly necessary to reduce a frequency that an unnecessary collision avoidance assist is performed by excluding the object which will not collide with the self-vehicle in fact from being a target of a collision avoidance assist.

FIG. 2 is a schematic view for showing a situation where a monorail crosses over a road on which a self-vehicle is running. When a monorail 31 crosses over a road on which a self-vehicle 10 is running as exemplified in FIG. 2, since the monorail 31 passes over the self-vehicle 10, there is no possibility that the monorail 31 and the self-vehicle 10 may collide with each other. Therefore, since it is not necessary to perform a collision avoidance assist even when the monorail 31 is detected by a front lateral side radar as an object which approaches the self-vehicle 10 from a lateral side, it is desirable to exclude the monorail 31 from being a target of the collision avoidance assist to reduce a frequency that an unnecessary collision avoidance assist is performed.

However, resolution in a vertical direction of a front lateral side radar is insufficient for judging correctly whether an object which approaches a self-vehicle from a lateral side corresponds to an upper object or not. For this reason, there is a possibility that it may be impossible to discriminate whether the monorail 31 is an upper object or not and, therefore, the monorail 31 may be recognized as an object which may collide with the self-vehicle 10 as illustrated by a broken line in FIG. 2.

Moreover, it is difficult to judge whether a possibility that an object which is detected by a front lateral side radar and moving to a front side of a self-vehicle from a front lateral side of the self-vehicle may collide with the self-vehicle is high or not by a judging method assuming that an object is detected by a front side radar like the above-mentioned conventional technology. Namely, in the art, a technology that can exclude an object with a low possibility of colliding with a self-vehicle among objects which are detected by a front lateral side radar and moving to a front side of the self-vehicle from a front lateral side of the self-vehicle from being a target of a collision avoidance assist to reduce a frequency that an unnecessary collision avoidance assist is performed has been demanded.

CITATION LIST

Patent Literature

[PTL1] Japanese Patent Application Laid-Open (kokai) No. 2016-218629
[PTL2] Japanese Patent Application Laid-Open (kokai) No. 2018-119985

SUMMARY OF INVENTION

Technical Problem

As mentioned above, in the art, a technology that can exclude an object with a low possibility of colliding with a self-vehicle among objects which are detected by a front lateral side radar and moving to a front side of the self-vehicle from a front lateral side of the self-vehicle from being a target of a collision avoidance assist to reduce a frequency that an unnecessary collision avoidance assist is performed has been demanded.

Solution to Problem

Therefore, as a result of diligent research, the present inventor has found out that the above-mentioned problem can be solved by judging a possibility that an object approaching a moving course of a self-vehicle from a front lateral side may collide with the self-vehicle based on whether a moving course of the object and a moving course of a precedence vehicle running ahead of the self-vehicle intersect with each other in a normal projection plane to a road surface or not.

Specifically, a driving assist apparatus according to the present invention (which may be referred to as a "present invention apparatus" hereafter) is a driving assist apparatus comprising a first object information acquisition means, a second object information acquisition means and a collision avoidance assist control means. The first object information acquisition means acquires first information that is information about an object which exists in a front side region of a self-vehicle. The second object information acquisition means acquires second information that is information about an object which exists in a front lateral side region of the self-vehicle. The collision avoidance assist control means performs a collision avoidance assist that is an assist for avoiding a collision of the self-vehicle and a collision risk object that is an object judged to have a high possibility to collide with the self-vehicle based on the first information and the second information when the collision risk object is judged to exist.

Furthermore, in the present invention apparatus, the first object information acquisition means acquires front side object information, and the second object information acquisition means acquires front lateral side object information. The front side object information is information about a position, a speed and a running direction of a front side object that is an object which exists in front of the self-vehicle. The front lateral side object information is information about a position, a speed and a running direction of a front lateral side object that is an object which exists in a front lateral side range. The front lateral side range is a predetermined range located in a lateral side with respect to a running direction of the self-vehicle.

In addition, in the present invention apparatus, the collision avoidance assist control means comprises a grade separation judging part and a collision risk exclusion judging part. The grade separation judging part carries out grade separation course judging processing. The grade separation course judging processing is processing in which a front lateral side object course that is a moving course of the front lateral side object calculated based on the front lateral side object information is judged to be a grade separation course when a positional relation between the front side object and the front lateral side object is judged to fulfill a predetermined condition based on the front side object information and the front lateral side object information. The grade separation course is a course which is away from a self-vehicle course that is a moving course of the self-vehicle in a vertical direction and does not intersect with the self-vehicle course. The collision risk exclusion judging part carries out collision risk exclusion processing. The collision risk exclusion processing is processing in which the front lateral side object existing in the front lateral side object course judged to be the grade separation course by the grade separation judging part is not judged to be the collision risk object.

Advantageous Effects of Invention

As mentioned above, in the present invention apparatus, the moving course of the front lateral side object is judged to be the grade separation course which is away from a self-vehicle course that is a moving course of the self-vehicle in a vertical direction and does not intersect with the self-vehicle course, when the positional relation between the front side object and the front lateral side object fulfills a predetermined condition. Then, as for the front lateral side object which exists in the front lateral side object course judged to be the grade separation course, a possibility to collide with the self-vehicle is not judged to be high. Thereby, in the present invention apparatus, the front lateral side object with a low possibility to collide with the self-vehicle can be excluded from being a target of the collision avoidance assist. Therefore, in accordance with the present invention apparatus, for example, issuance of an unnecessary alarm and/or execution of unnecessary automatic braking and/or automatic steering due to execution of unnecessary collision avoidance assist can be reduced, and a crossing-collision Pre-Crash Safety System (PCS) with high market receptivity can be provided.

Other objectives, other features and accompanying advantages of the present invention will be easily understood from the following explanation about respective embodiments of the present invention, which will be described referring to drawings.

BRIEF DESCRIPTION OF DRAWINGS

FIG. 12 is a schematic view for explaining an example of a procedure along which a grade separation judging part which a collision avoidance assist control means comprises calculates a front lateral side object course that is a moving course of a front lateral side object, as a straight line, based on a position, a speed and a running direction of the front lateral side object acquired as front lateral side object information by a second object information acquisition means.

DESCRIPTION OF EMBODIMENTS

First Embodiment

Hereafter, a driving assist apparatus according to a first embodiment of the present invention (which may be referred to as a "first apparatus" hereafter.) will be explained, referring to drawings.

Figure 3:
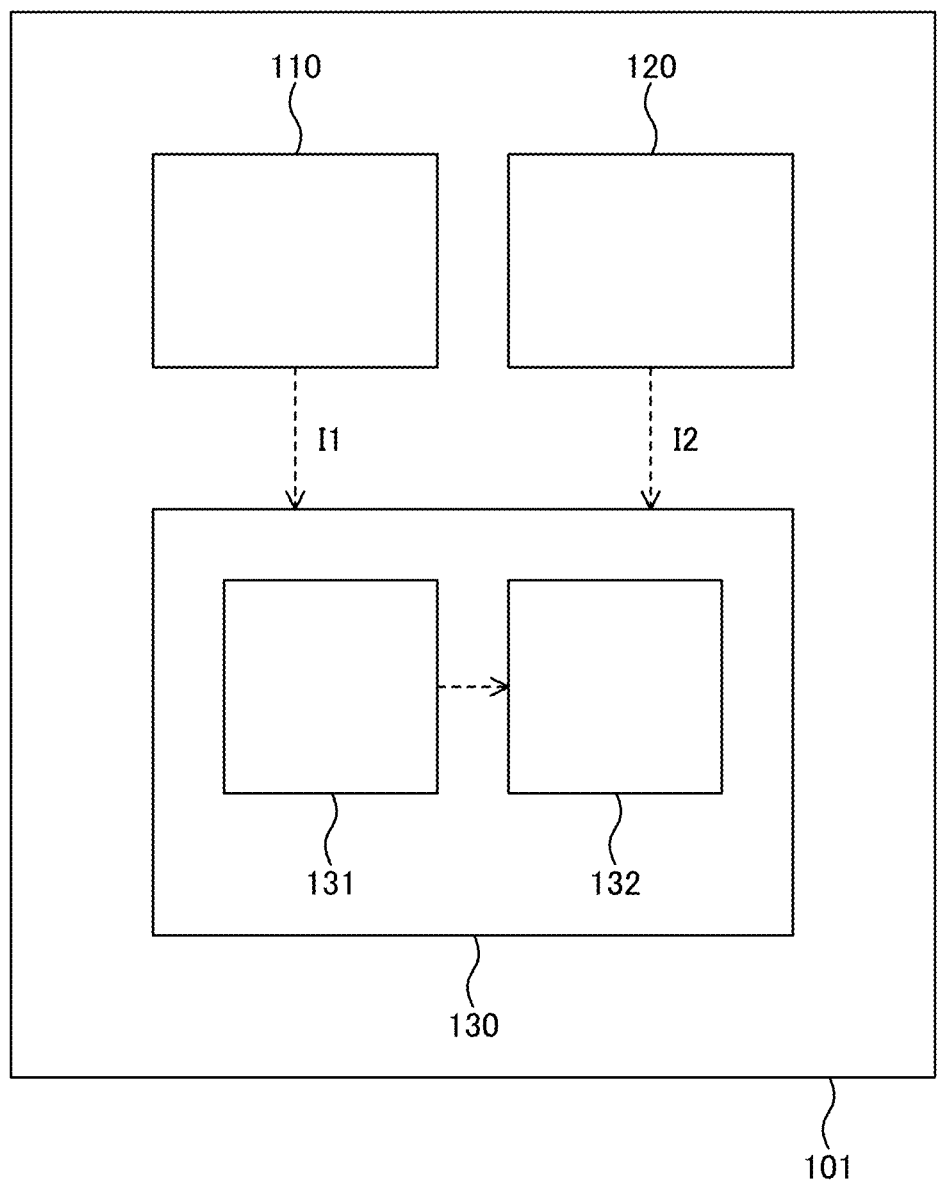
FIG. 3 is a schematic block diagram for showing an example of a configuration of a driving assist apparatus according to a first embodiment of the present invention (first apparatus).

FIG. 3 is a schematic block diagram for showing an example of a configuration of the first apparatus. Arrows illustrated by a broken line in FIG. 3 express flows of (data signals including) information in the first apparatus exemplified in FIG. 3.

A first apparatus 101 is a driving assist apparatus comprising a first object information acquisition means 110, a second object information acquisition means 120 and a collision avoidance assist control means 130. The first object information acquisition means 110 acquires first information I1 that is information about an object which exists in a front side region of a self-vehicle. The first object information acquisition means 110 is a radar system, such as a milliwave radar configured so as to detect an object which exists in a front side region of a self-vehicle, for example (which may be referred to as a "front side radar" hereafter). The first information I1 includes information about a position, a speed and a running direction of an object detected by the first object information acquisition means 110, for example.

The second object information acquisition means 120 acquires second information I2 that is information about an object which exists in a front lateral side region of the self-vehicle. The second object information acquisition means 120 is a radar system, such as a milliwave radar configured so as to detect an object which exists in a front lateral side region of a self-vehicle, for example (which may be referred to as a "front lateral side radar" hereafter). The second information I2 includes information about a position, a speed and a running direction of an object detected by the second object information acquisition means 120, for example.

The collision avoidance assist control means 130 performs a collision avoidance assist that is an assist for avoiding a collision of the self-vehicle and a collision risk object that is an object judged to have a high possibility to collide with the self-vehicle based on the first information I1 and the second information I2 when the collision risk object is judged to exist. The collision avoidance assist includes an alarm to a driver and vehicle control for avoiding a collision, etc., for example. As specific examples of the alarm, generation of sound, light and vibration, and display of an image and/or a character, etc. can be exemplified, for example.

Sound as an alarm can be generated from a sound generator that is a device which generates sound, such as an audio instrument and/or a buzzer which the self-vehicle comprises, for example. As specific example of such sound, sound (for example, alarm sound, etc.), voice (including synthetic voice) and music, etc. can be exemplified, for example. Light as an alarm can be generated from an electric bulb and/or a light emitting element (for example, a light emitting diode (LED), etc.) which a light generator that is a device which generates light, such as a warning light which the self-vehicle comprises, for example.

Vibration as an alarm can be generated from a vibration generator that is a device which generates vibration, such as a motor and/or vibrator incorporated so as to vibrate a handle and/or seat, etc. which the self-vehicle comprises, for example. An image and/or a character as an alarm can be displayed by an image display device which displays an image and/or a character, such as a multi-information display (MID) and a display of multimedia (MM) apparatus which the self-vehicle comprises, for example. As a specific example of such an image, a still picture (for example, a figure, a pattern and a mark, etc.) and a video (for example, an animation, etc.), etc. can be exemplified, for example.

As a specific example of vehicle control, automatic braking, automatic steering, etc. can be mentioned, for example. Such vehicle control can be carried out by operating a brake mechanism and a steering mechanism which the self-vehicle comprises by an actuator, etc. which are controlled by the collision avoidance assist control means, for example.

Figure 4:
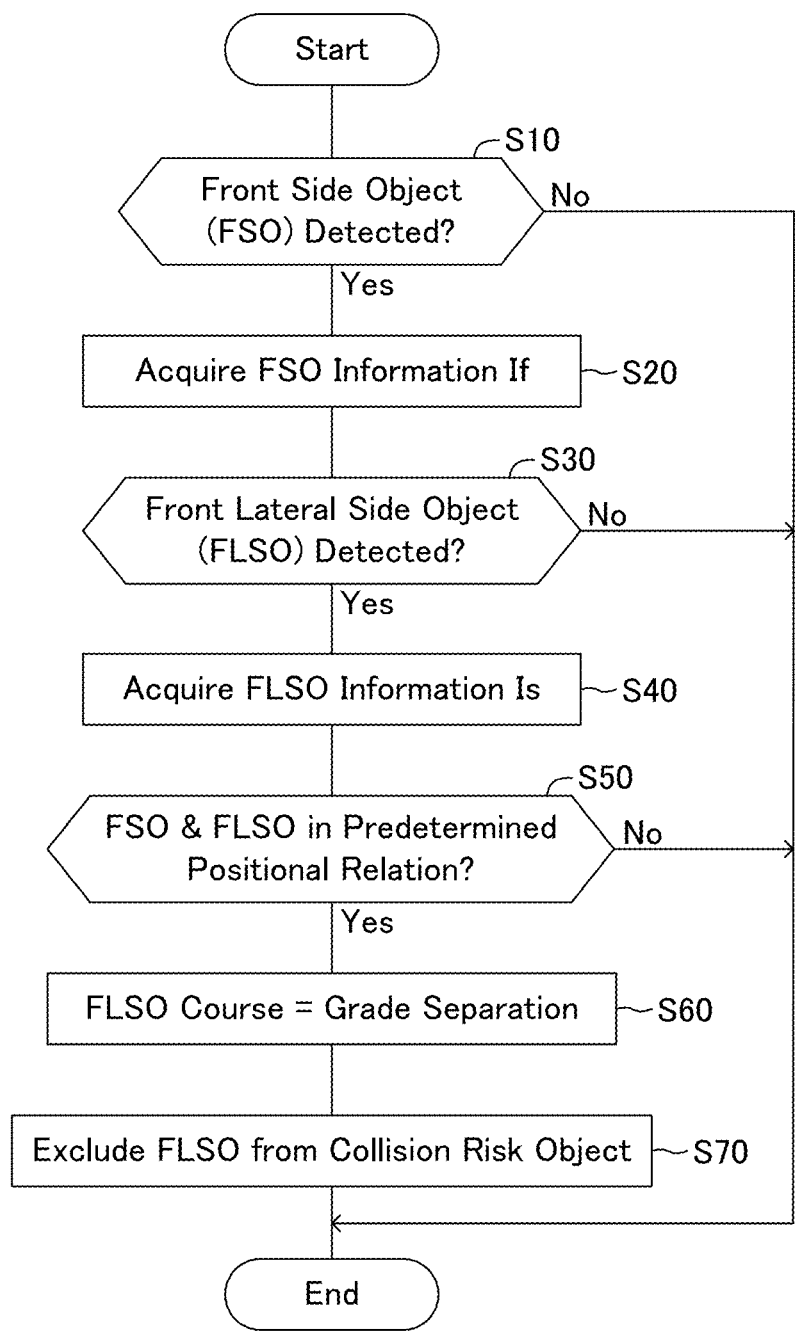
FIG. 4 is a flow chart for showing an example of a flow of various processing in a collision risk exclusion routine including grade separation (overhead crossing) course judging processing and collision risk exclusion processing which are carried out in the first apparatus.

Furthermore, in the first apparatus 101, processing in which an object judged to have a low possibility to collide with a self-vehicle is excluded from being a target of the collision avoidance assist is performed, even when the object is detected as an object which exists in the front lateral side region of self-vehicle. Hereafter, the routine will be referred to as a "collision risk exclusion routine." FIG. 4 is a flow chart for showing an example of a flow of various processing in a collision risk exclusion routine including grade separation (overhead crossing) course judging processing and collision risk exclusion processing which are carried out in the first apparatus. In the first apparatus 101, the collision risk exclusion routine which will be explained in detail below is repeatedly carried out with a predetermined short time interval (for example, 0.05 second).

When the collision risk exclusion routine is started, in the first apparatus 101, the first object information acquisition means 110 acquires the front side object information If (Steps S10 and S20), and the second object information acquisition means 120 acquires the front lateral side object information Is (Steps S30 and S40). The front side object information If is information about the position, the speed and the running direction of a front side object that is an object which exists in front of the self-vehicle. Namely, the front side object information If can be acquired from the above-mentioned first information I1. The front lateral side object information Is is information about the position, the speed and the running direction of a front lateral side object that is an object which exists in the front lateral side range. Namely, the front lateral side object information Is can be acquired from the above-mentioned second information I2.

Figure 1:
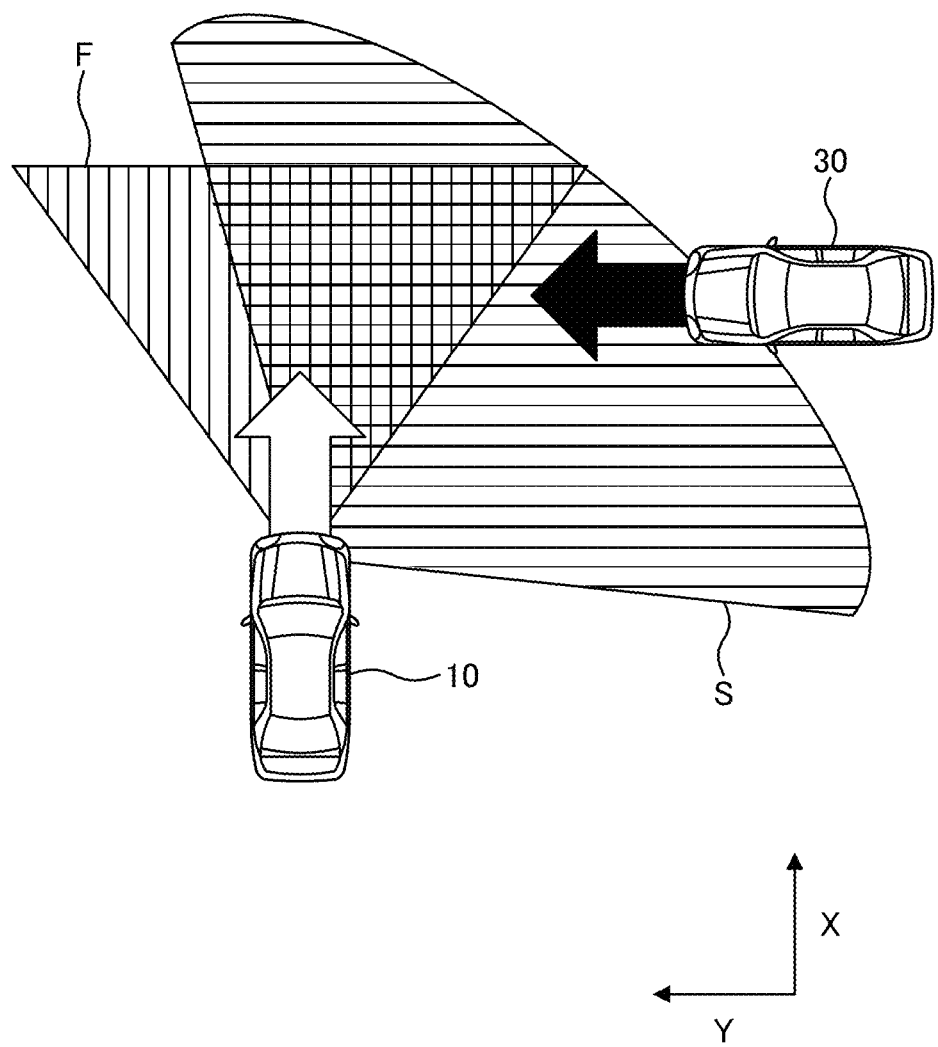
FIG. 1 is a schematic view for showing a situation where another vehicle is approaching a self-vehicle comprising a front side radar and a front lateral side radar from a lateral side.
Figure 2:
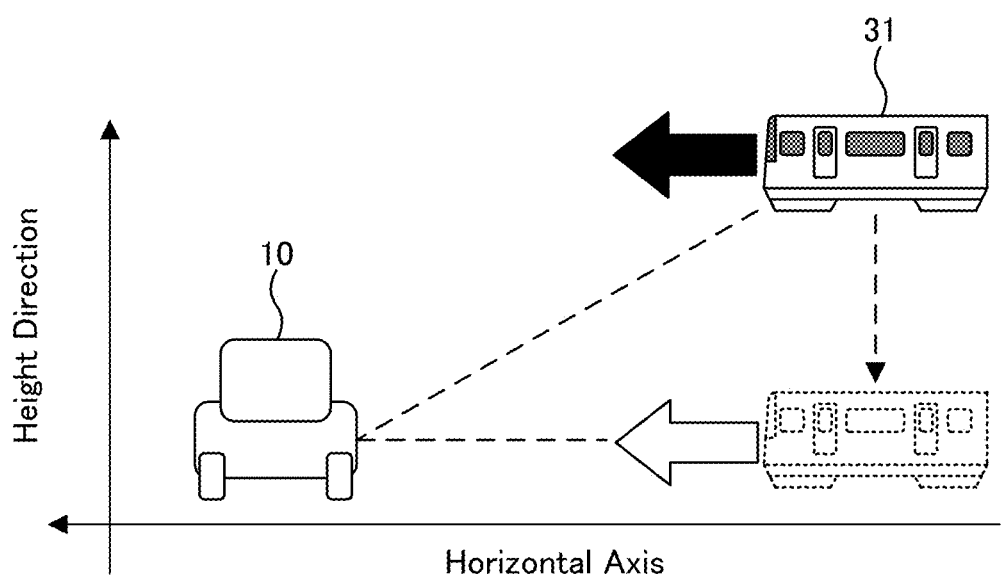
FIG. 2 is a schematic view for showing a situation where a monorail crosses over a road on which a self-vehicle is running.

The front lateral side range is a predetermined range located in a lateral side with respect to a running direction of the self-vehicle. The front lateral side range may be the whole range in which an object with a high possibility of collision with the self-vehicle can be discriminated from an object with a low possibility of collision with the self-vehicle (for example, an upper object) within a region in which an object which exists in the front lateral side region of the self-vehicle can be detected by the second object information acquisition means (for example, the region S illustrated in FIG. 1). Alternatively, the front lateral side range may be a region obtained by removing a range in which an object with a high possibility of collision with the self-vehicle can be discriminated from an object with a low possibility of collision with the self-vehicle within a region in which an object which exists in the front side region of the self-vehicle can be detected by the first object information acquisition means (for example, the region F illustrated in FIG. 1) from a range in which an object with a high possibility of collision with the self-vehicle can be discriminated from an object with a low possibility of collision with the self-vehicle (for example, an upper object) within a region in which an object which exists in the front lateral side region of the self-vehicle can be detected by the second object information acquisition means (for example, the region S illustrated in FIG. 1).

In addition, in the first apparatus 101, the collision avoidance assist control means 130 comprises the grade separation judging part 131 and the collision risk exclusion judging part 132. The grade separation judging part 131 carried out grade separation course judging processing (Steps S50 and S60). The grade separation course judging processing is processing in which a front lateral side object course that is a moving course of the front lateral side object calculated based on the front lateral side object information Is is judged to be a grade separation course (Step S60) when a positional relation between the front side object and the front lateral side object is judged to fulfill a predetermined condition based on the front side object information If and the front lateral side object information Is (Step S50; Yes). The grade separation course is a course which is away from a self-vehicle course that is a moving course of the self-vehicle in a vertical direction and does not intersect with the self-vehicle course.

Namely, in the grade separation course judging processing, it is judged whether the positional relation of a front side object and a front lateral side object fulfills a predetermined condition or not based on the front side object information If and the front lateral side object information Is. This "predetermined condition" is that the front lateral side object course and the self-vehicle course do not intersect with each other in a three-dimensional space including a vertical direction and two directions in a plane including a road surface on which the self-vehicle is running, for example.

It can be said that the predetermined condition as mentioned above is that a possibility that the front side object and the front lateral side object may collide with each other when it is presumed that both the front side object and the front lateral side object are running on a plane located in the same height in the vertical direction is judged to be high, for example. It can be considered that, when the front side object and the front lateral side object can be in a positional relation with a high possibility of colliding if both are running on the plane located in the same height, the moving courses of them exist at different heights in the vertical direction. In other words, it can be said that the predetermined condition is that a front side object course that is a moving course of the front side object and the front lateral side object course intersect with each other in a normal projection plane to the road surface. Details of such a predetermined condition will be mentioned later in detail in explanation about other embodiments of the present invention.

When the above-mentioned predetermined condition is satisfied, the grade separation judging part 131 judges that the front lateral side object course is a grade separation course. The grade separation course is a course which is away from a self-vehicle course that is a moving course of the self-vehicle in a vertical direction and does not intersect with the self-vehicle course. Namely, when the above-mentioned predetermined condition is satisfied, it is possible to judge that the front lateral side object which is running in the front lateral side object course and the self-vehicle can pass each other at different positions in the vertical direction without colliding with each other.

On the other hand, the collision risk exclusion judging part 132 carries out collision risk exclusion processing. The collision risk exclusion processing is processing in which the front lateral side object existing in the front lateral side object course judged to be the grade separation course by the grade separation judging part 131 is not judged to be the collision risk object (Step S70). As mentioned above, the collision risk object is an object judged to have a high possibility to collide with the self-vehicle, and is an object to be a target on which the collision avoidance assist that is an assist for avoiding a collision with the self-vehicle by the collision avoidance assist control means. Namely, the front lateral side object which exists in the front lateral side object course judged to be the grade separation course is judged to have a low possibility to collide with the self-vehicle, and is excluded from being a target of the collision avoidance assist.

In addition, when a judgment result is "No" in any of Step S10 in which it is judged whether the front side object has been detected or not, Step S30 in which it is judged whether the front lateral side object has been detected or not, and Step S50 in which it is judged whether the front side object and the front lateral side object are in a predetermined positional relation or not, the collision risk exclusion routine is once ended at that time point.

Functions of the first apparatus as mentioned above can be realized by an ECU mounted on the self-vehicle, for example. In the present specification, the "ECU" is an electronic control unit which comprises a microcomputer as its principal part, and may be referred to as a "controller." The microcomputer includes a CPU (processor), ROM, RAM, nonvolatile memory and an interface, etc. The CPU is configured so as to realize various functions by carrying out instructions (programs, routines) stored in the ROM. These various functions may be carried out by one specific ECU which constitutes the first apparatus, or may be carried out dispersively by a plurality of ECUs. In the case of the latter, the plurality of the ECUs can be configured so as to be connected through a CAN (Controller Area Network) and to be able to communicate with each other, for example.

As mentioned above, in the first apparatus, the moving course of the front lateral side object is judged to be the grade separation course which is away from a self-vehicle course that is a moving course of the self-vehicle in a vertical direction and does not intersect with the self-vehicle course, when the positional relation between the front side object and the front lateral side object fulfills a predetermined condition. Then, as for the front lateral side object which exists in the front lateral side object course judged to be the grade separation course, a possibility to collide with the self-vehicle is not judged to be high. Thereby, in the first apparatus, the front lateral side object with a low possibility to collide with the self-vehicle can be excluded from being a target of the collision avoidance assist. Therefore, in accordance with the first apparatus, for example, issuance of an unnecessary alarm and/or execution of unnecessary automatic braking and/or automatic steering due to execution of unnecessary collision avoidance assist can be reduced, and a crossing-collision Pre-Crash Safety System (PCS) with high market receptivity can be provided.

By the way, objects, such as a plurality of vehicles running on a road overpassing or underpassing a road on which the self-vehicle is running and a plurality of carriages constituting a monorail running on a track overpassing or underpassing a road on which the self-vehicle is running exist in the front lateral side object course calculated for the front lateral side object detected previously, and the following objects move along the course. Therefore, it is desirable that collision risk exclusion judging part judges that such objects exist on the grade separation course to exclude them from being a target of the collision avoidance assist (not to judge that they are the collision risk objects).

On the other hand, for example, an object which appeared in the front lateral side range in the middle of execution of the collision risk exclusion routine, such as another vehicle advanced into a front side of the self-vehicle from a side road, etc., may be misidentified as an object which has been already detected as the front lateral side object existing in a front lateral side object course. Since such an object does not necessarily move along the front lateral side object course, it is not desirable to exclude the object from being a target of the collision avoidance assist.

Therefore, in the first apparatus according to a preferred aspect, the collision risk exclusion judging part may be configured so as to judge that the front lateral side object exists in the grade separation course only when both of first and second conditions listed below are satisfied.

The first condition: In a two-dimensional coordinate system, an absolute value of a difference between a calculated coordinate value that is a coordinate value of the front lateral side object in one coordinate axis calculated by applying a coordinate value of the front lateral side object in the other coordinate axis included in the front lateral side object information acquired by the second object information acquisition means to the front lateral side object course calculated by the grade separation judging part and a detected coordinate value that is an actual coordinate value of the front lateral side object in the above-mentioned one coordinate axis included in the front lateral side object information acquired by the second object information acquisition means is equal to or less than a predetermined threshold value.

The second condition: An absolute value of a difference between a calculated angle that is an inclination of the front lateral side object course at coordinates of the front lateral side object in the two-dimensional coordinate system and a detected angle that is an inclination corresponding to a running direction of the front lateral side object acquired by the second object information acquisition means is equal to or less than a predetermined threshold value.

Figure 5:
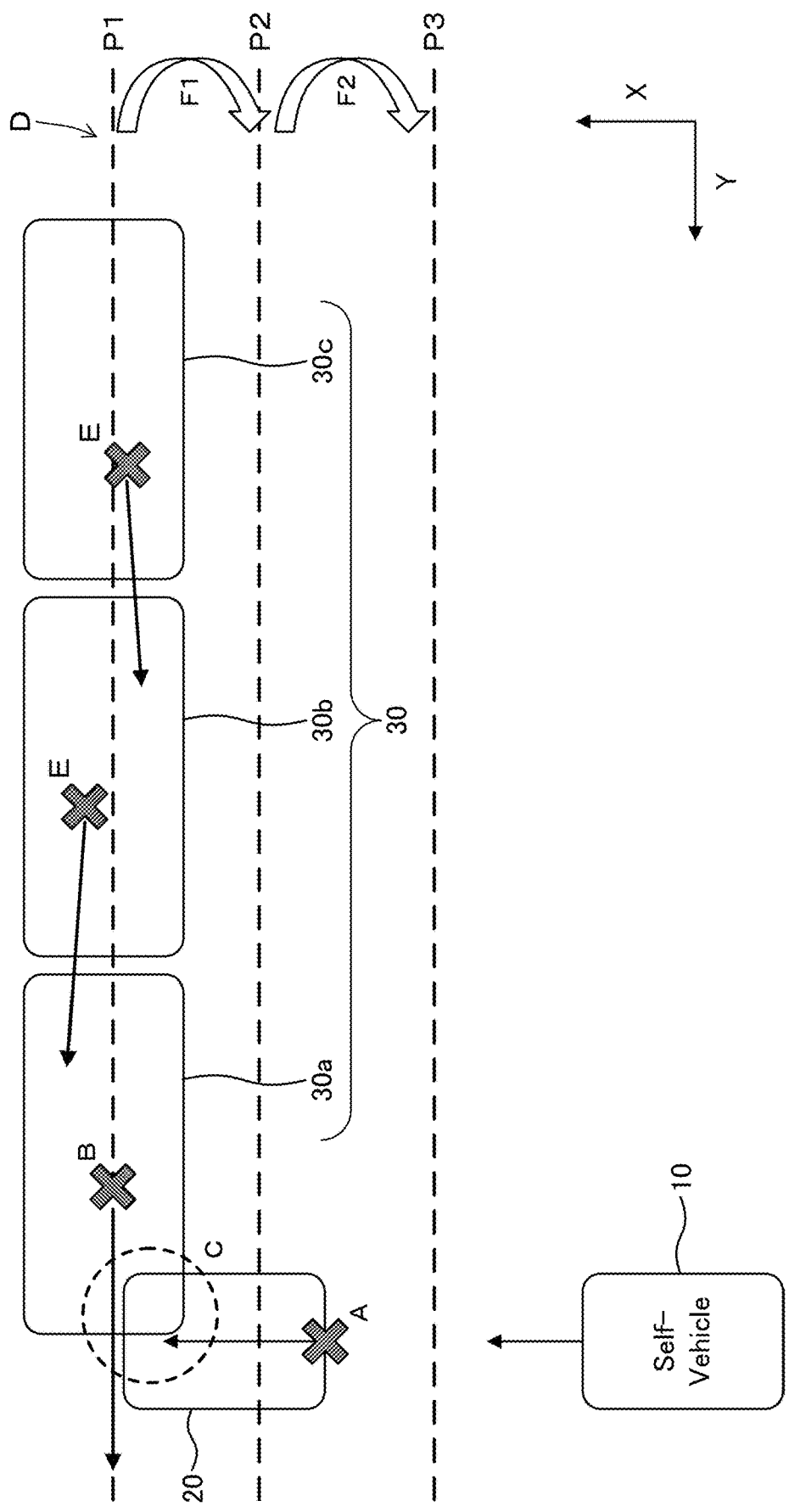
FIG. 5 is a schematic view for explaining the collision risk exclusion routine carried out in the first apparatus according to a preferred aspect.

FIG. 5 is a schematic view for explaining the collision risk exclusion routine carried out in the first apparatus according to a preferred aspect. In an example shown in FIG. 5, when the collision risk exclusion routine is started, as indicated by an x mark A, a precedence vehicle which is running ahead of the self-vehicle 10 in the same direction as the self-vehicle 10 is detected as the front side object 20 (Step S10) and the front side object information If is acquired (Step S20) by the first object information acquisition means 110. Next, as indicated by an x mark B, a monorail which is running in the front lateral side (front lateral side range) of the self-vehicle is detected as the front lateral side object 30 (Step S30) and the front lateral side object information Is is acquired (Step S40) by the second object information acquisition means 120. The monorail as the front lateral side object 30 is a monorail in a three-carriage formation which consists of three carriages 30a, 30b and 30c. In the following explanation, the precedence vehicle as the front side object 20 may be referred to as a "precedence vehicle 20", and the monorail as the front lateral side object 30 may be referred to as a "monorail 30."

Next, as indicated by a part C surrounded by a thick broken line, the grade separation course judging processing is carried out by the grade separation judging part 131 which the collision avoidance assist control means 130 comprises (Steps S50 and S60). Namely, it is judged whether the positional relation between the front side object 20 and the front lateral side object 30 fulfills a predetermined condition or not based on the front side object information If and the front lateral side object information Is (Step S50). In the example shown in FIG. 5, it is judged whether the moving course (front side object course) of the precedence vehicle 20 (front side object) and the moving course (front lateral side object course) of the head carriage (first car) 30a (front lateral side object) of the monorail 30 overlap each other in a planar view or not. When judged that the front side object course and the front lateral side object course overlap each other in a planar view (Step S50: Yes), as pointed out by D, a front lateral side object course P1 is calculated based on the front lateral side object information Is, and the front lateral side object course P1 is judged to be the grade separation course (Step S60).

Then, the collision risk exclusion processing is carried out by the collision risk exclusion judging part 132 which the collision avoidance assist control means 130 comprises, and the front lateral side object 30 which exists in the front lateral side object course P1 judged to be the grade separation course by the grade separation judging part 131 is not judged to be the collision risk object (excluded from being a target of the collision avoidance assist) (Step S70). In this case, the front lateral side object which is the target of the collision risk exclusion processing is not limited to the carriage 30$a$ at the head of the monorail 30. The following carriages 30$b$ and 30$c$ also exist in the front lateral side object course P1 and are moving toward the same direction as the head carriage 30$a$, as shown by x marks E and arrows extending from the x marks E.

Therefore, in the two-dimensional coordinate system shown in the lower right of FIG. 5, the coordinate values of the following carriages 30$b$ and 30$c$ in the X-axis calculated by applying coordinate values (calculated coordinate values) of the following carriages 30$b$ and 30$c$ in the Y-axis included in the front lateral side object information Is acquired by the second object information acquisition means 120 to the front lateral side object course P1 calculated for the head carriage 30$a$ of the monorail 30 are values which are equal or close to the actual coordinate values (detected coordinate values) of the following carriages 30$b$ and 30$c$ in the X-axis included in the front lateral side object information Is acquired by the second object information acquisition means 120 (the absolute values of differences between the calculated coordinate values and the detected coordinate values are equal to or less than a predetermined threshold value). Namely, the first condition is satisfied. Moreover, the inclinations (calculated angles) of the front lateral side object course P1 at coordinates of the following carriages 30$b$ and 30$c$ in the above-mentioned two-dimensional coordinate system are values which are equal or close to the inclinations (detected angles) corresponding to running directions of the following carriages 30$b$ and 30$c$ acquired by the second object information acquisition means 120 (the absolute values of differences between the calculated angles and the detected angles are equal to or less than a predetermined threshold value). Namely, the second condition is satisfied. As a result, in the first apparatus according to the preferred aspect, the following carriages 30$b$ and 30$c$ are not judged to be the collision risk objects (excluded from being targets of the collision avoidance assist), either.

However, unlike the above, an object which appeared in the front lateral side range in the middle of execution of the collision risk exclusion routine does not necessarily move along the front lateral side object course, and the absolute value of a difference between the calculated coordinate value and the detected coordinate value is more than a predetermined threshold value and/or the absolute value of a difference between the calculated angle and the detected angle is more than a predetermined threshold value. Namely, either one or both of the second condition and the second condition is not satisfied. As a result, in the first apparatus according to the preferred aspect, an object which appeared in the front lateral side range in the middle of execution of the collision risk exclusion routine, such as another vehicle advanced into a front side of the self-vehicle from a side road, etc., such an object is not excluded from being a target of the collision avoidance assist. Therefore, in accordance with the first apparatus according to the preferred aspect, it can be avoided that an object which appeared in the front lateral side range in the middle of execution of the collision risk exclusion routine, such as another vehicle advanced into a front side of the self-vehicle from a side road, etc., is misidentified as an object which has been already detected as the front lateral side object existing in a front lateral side object course to be excluded from being a target of the collision avoidance assist.

In addition, in the example shown in FIG. 5, as shown by outlined and curved arrows F1 and F2, the front lateral side object course P1 that is a moving course of the monorail 30 is being updated to the new front lateral side object course P2 and P3 as the self-vehicle 10 advances to approach the moving course of the monorail 30. Such an update of the front lateral side object course will be explained in detail in an explanation about another embodiment of the present invention which will be mentioned later Second Embodiment Hereafter, a driving assist apparatus according to a second embodiment of the present invention (which may be referred to as a "second apparatus" hereafter.) will be explained, referring to drawings.

As mentioned above, in the first apparatus, by execution of the collision risk exclusion routine, the front lateral side object with a low possibility to collide with the self-vehicle can be excluded from being a target of the collision avoidance assist, for example, issuance of an unnecessary alarm and/or execution of unnecessary automatic braking and/or automatic steering can be reduced. However, in a situation where the running direction of the self-vehicle is changing every moment, such as a curve running, for example, it may be difficult to judge correctly whether the positional relation between the front side object and the front lateral side object fulfills a predetermined condition or not by the above-mentioned grade separation course judging processing. Namely, in a state where the self-vehicle is not going straight, it may be difficult to judge correctly whether the front lateral side object course corresponds to the grade separation course or not. When the grade separation course judging processing is performed in such a situation, there is a possibility that a front lateral side object with a high possibility to collide with the self-vehicle may be erroneously excluded from being a target of the collision avoidance assist.

Therefore, the second apparatus is the above-mentioned first apparatus characterized in that the collision avoidance assist control means carries out the grade separation course judging processing and the collision risk exclusion processing only when the self-vehicle is judged to be in a straight running state.

In the second apparatus according to a preferred aspect, the collision avoidance assist control means may be configured so as to judge that the self-vehicle is in a straight running state when a curvature radius of the self-vehicle course is larger than a predetermined threshold value.

Figure 6:
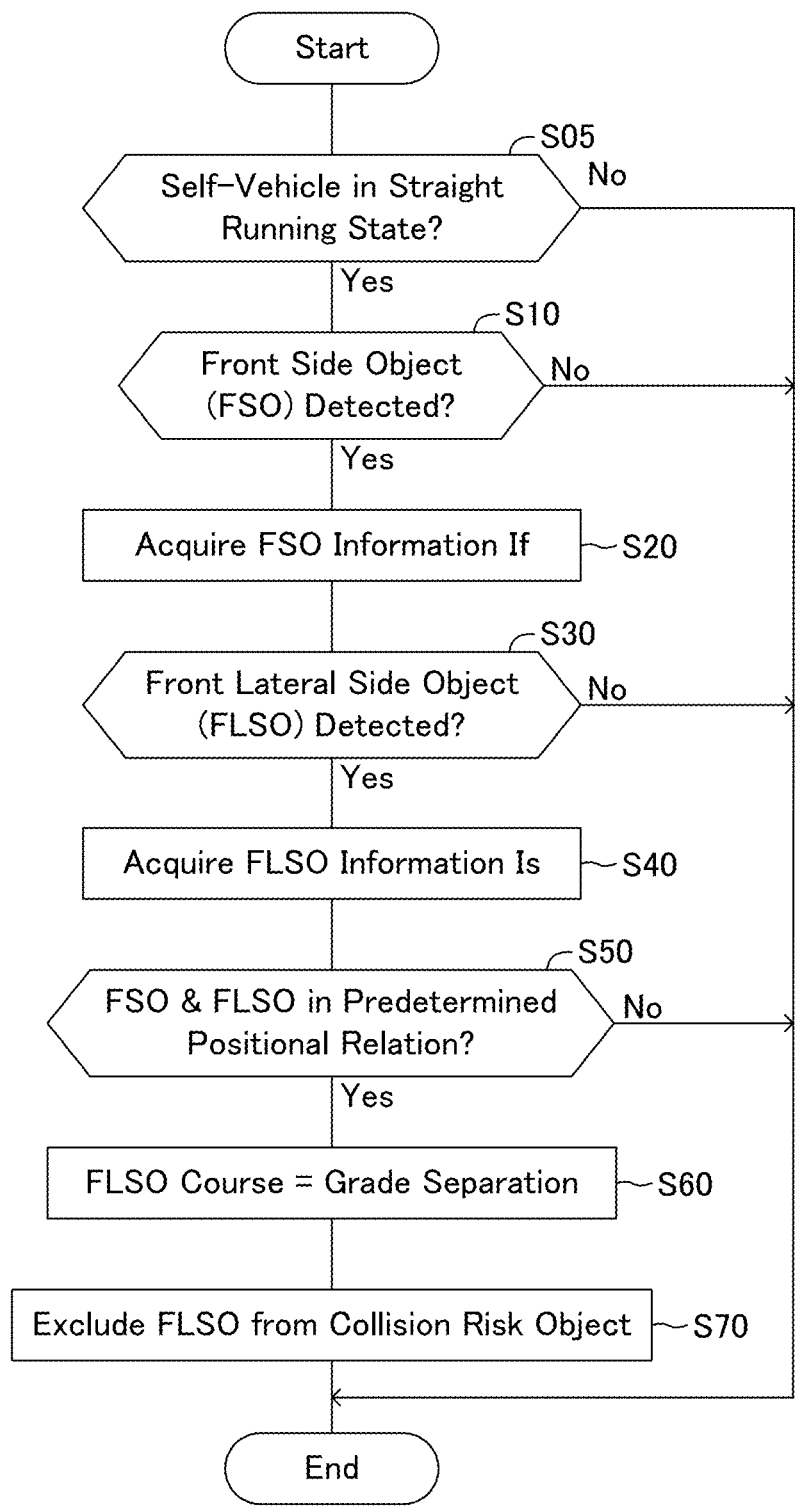
FIG. 6 is a flow chart for showing an example of a flow of various processing in a collision risk exclusion routine including grade separation course judging processing and collision risk exclusion processing which are carried out in a driving assist apparatus according to a second embodiment of the present invention (second apparatus).

FIG. 6 is a flow chart for showing an example of a flow of various processing in a collision risk exclusion routine including grade separation course judging processing and collision risk exclusion processing which are performed in the second apparatus. The flow chart exemplified in FIG. 6 is the same as the flow chart exemplified in FIG. 4, except for the point that Step S05 in which it is judged whether the self-vehicle is in a straight running state or not is added before the first object information acquisition means 110 acquires the front side object information If (Steps S10 and S20).

Namely, in the collision risk exclusion routine performed in the second apparatus which is expressed by the flow chart exemplified in FIG. 6, it is first judged in Step S05 whether the self-vehicle is in a straight running state or not. When the self-vehicle is in a straight running state, it is judged as "Yes" in Step S05, and processing progresses to the following Step S10. A flow of processing after Step S10 is the same as that of the collision risk exclusion routine performed in the first apparatus which is expressed by the above-mentioned flow chart exemplified in FIG. 4. On the other hand, when the self-vehicle is not in a straight running state, but is in a situation where the running direction of the self-vehicle is changing every moment, such as a curve running, for example, etc., it is judged as "No" in Step S05, and the collision risk exclusion routine is once ended.

As mentioned above, in the second apparatus, the collision avoidance assist control means carries out the grade separation course judging processing and the collision risk exclusion processing only when it is judged that the self-vehicle is in a straight running state. Therefore, the grade separation course judging processing can be prevented from being carried out to lead to incorrect judgement on whether the positional relation between the front side object and the front lateral side object fulfills a predetermined condition or not in a situation where the running direction of the self-vehicle is changing every moment, such as a curve running, for example. As a result, in accordance with the second apparatus, since it is prevented from being incorrectly judged whether the front lateral side object course corresponds to the grade separation course or not, a possibility that a front lateral side object with a high possibility to collide with the self-vehicle may be erroneously excluded from being a target of the collision avoidance assist can be reduced.

Third Embodiment

Hereafter, a driving assist apparatus according to a third embodiment of the present invention (which may be referred to as a "third apparatus" hereafter.) will be explained.

As mentioned above, in the first apparatus and the second apparatus, the first object information acquisition means detects an object which exists in front of a self-vehicle as a front side object, and acquires front side object information. However, from a viewpoint of reducing an operation load in the ECU for excluding a front lateral side object with a low possibility to collide with the self-vehicle from being a target of the collision avoidance assist, for example, it is desirable to set only a front side object which is suitable for judging a possibility that the front lateral side object and the self-vehicle may collide with each other as a target of the grade separation course judging processing. In other words, when an object which is not suitable for judging a possibility that the front lateral side object and the self-vehicle may collide with each other is subjected to the grade separation course judging processing as a front side object, it is difficult to correctly judge a possibility that the front lateral side object and the self-vehicle may collide with each other, even if the target is an object which exists in front of the self-vehicle. As specific examples of such an object which is not suitable for judging a possibility that the front lateral side object and the self-vehicle may collide with each other, an object moving in a direction different from the running direction of the self-vehicle and an object at rest (stationary object) and the like, for example.

Therefore, the third apparatus is the above-mentioned first or second apparatus, characterized in that the first object information acquisition means judges an object which exists in front of the self-vehicle and is moving in the same direction as the running direction of the self-vehicle to be the front side object.

As mentioned above, in the third apparatus, only an object which exists in front of the self-vehicle and is moving in the same direction as the running direction of the self-vehicle is detected as the front side object. Namely, an object which is not suitable for judging a possibility that the front lateral side object and the self-vehicle may collide with each other, such as an object moving in a direction different from the running direction of the self-vehicle and an object at rest (stationary object), for example, is excluded from the front side object. Thereby, the operation load in the ECU for excluding a front lateral side object with a low possibility to collide with the self-vehicle from being a target of the collision avoidance assist, for example, can be reduced.

On the other hand, when it is judged that the moving course of the front side object moving ahead of the self-vehicle in the same direction as that of the self-vehicle and the moving course of the front lateral side object do not intersect with each other in the grade separation course judging processing, it can be judged that the moving course of the self-vehicle moving behind the front side object in the same direction as that of the front side object and the moving course of the front lateral side object do not intersect with each other. Namely, for example, issuance of an unnecessary alarm and/or execution of unnecessary automatic braking and/or automatic steering due to execution of unnecessary collision avoidance assist can be reduced, and a crossing-collision Pre-Crash Safety System (PCS) with high market receptivity can be provided.

By the way, even when an object which exists in front of the self-vehicle and is moving in the same direction as the running direction of the self-vehicle is detected at a certain time point and the object concerned is judged to be the front side object, the object is not necessarily in the same situation as the above at a different time point. In other words, there is a possibility that an object which exists in front of the self-vehicle and is moving in the same direction as the running direction of the self-vehicle at a certain time point may not exist in front of the self-vehicle or may be moving in a different direction from the running direction of the self-vehicle at a different time point.

Therefore, in the third apparatus according to a preferred aspect, the first object information acquisition means may be configured so as to judge an object which exists in front of the self-vehicle and is moving in the same direction as the running direction of the self-vehicle, as well as has a history that frequency of a state where a value obtained by subtracting a speed of the self-vehicle from a speed of the object in the running direction of the self-vehicle calculated based on the first information is larger than a predetermined threshold value within a time period in which a predetermined time has passed until the present time is equal to or more than a predetermined number of times, to be the front side object.

The object having a history that frequency of a state where a value obtained by subtracting a speed of the self-vehicle from a speed of the object in the running direction of the self-vehicle calculated based on the first information is larger than a predetermined threshold value within a time period in which a predetermined time has passed until the present time is equal to or more than a predetermined number of times as mentioned above has a higher possibility to be a vehicle preceding the self-vehicle, as compared with an object which exists in front of the self-vehicle and is moving in the same direction as the running direction of the self-vehicle, but does not have such a history. Namely, a probability of the judgement that the object corresponds to the front side object is high. Therefore, in accordance with the third apparatus according to a preferred aspect, since only a front side object which is more suitable for judging a possibility that the front lateral side object and the self-vehicle may collide with each other can be set as a target of the grade separation course judging processing, the operation load in the ECU for excluding a front lateral side object with a low possibility to collide with the self-vehicle from being a target of the collision avoidance assist, for example, can be reduced further.

Fourth Embodiment

Hereafter, a driving assist apparatus according to a fourth embodiment of the present invention (which may be referred to as a "fourth apparatus" hereafter.) will be explained.

As mentioned above, in the first apparatus to the third apparatus, the second object information acquisition means acquires front lateral side object information that is information about a position, a speed and a running direction of a front lateral side object that is an object which exists in a front lateral side range that is a predetermined range located in a lateral side with respect to a running direction of the self-vehicle. However, from a viewpoint of reducing an operation load in the ECU for excluding a front lateral side object with a low possibility to collide with the self-vehicle from being a target of the collision avoidance assist, for example, it is desirable to set only the front lateral side object, on which a possibility that the front lateral side object and the self-vehicle may collide with each other should be judged, as the target of the collision avoidance assist. In other words, in the first place, subjecting an object with a very low possibility to collide with the self-vehicle to the grade separation course judging processing as the front lateral side object only raise the operation load in vain and does not contribute the exclusion of a front lateral side object with a low possibility to collide with the self-vehicle from being a target of the collision avoidance assist, even when the object exists in the front lateral side range. Therefore, it is desirable to subject only an object with a high possibility to collide with the self-vehicle among objects which exist in the front lateral side range to the grade separation course judging processing as the front lateral side object.

As a specific example of a front lateral side object as mentioned above, an object which exists in the front lateral side range and is approaching the self-vehicle in a direction perpendicular to the running direction of the self-vehicle at a speed larger than a predetermined threshold value in a running direction with an angle to a direction perpendicular to the running direction of the self-vehicle equal to or less than a predetermined threshold value, at a distance from the self-vehicle in the direction perpendicular to the running direction of the self-vehicle larger than a predetermined threshold value. An object approaching the self-vehicle in the direction perpendicular to the running direction of the self-vehicle at a large speed has a high possibility to arrive at a position where a collision of the object and the self-vehicle may take place in a short time. Moreover, an object with a small angle between a direction perpendicular to the running direction of the self-vehicle and the running direction of the object has a high possibility to cross the moving course of the self-vehicle.

Furthermore, an object at a large distance from the self-vehicle in the direction perpendicular to the running direction of the self-vehicle has a possibility not to be detected by the first object information acquisition means (for example, front side radar, etc.).

Therefore, the fourth apparatus is any one of the above-mentioned first to third apparatuses, characterized in that the second object information acquisition means judges an object which exists in the front lateral side range and is approaching the self-vehicle in a direction perpendicular to the running direction of the self-vehicle at a speed larger than a predetermined threshold value in a running direction with an angle to a direction perpendicular to the running direction of the self-vehicle equal to or less than a predetermined threshold value, at a distance from the self-vehicle in the direction perpendicular to the running direction of the self-vehicle larger than a predetermined threshold value to be the front lateral side object.

As apparent from the above, in the fourth apparatus, only an object with a high possibility to collide with the self-vehicle among objects which exist in the front lateral side range is judged as a front lateral side object to be subjected to the grade separation course judging processing. Therefore, in accordance with the fourth apparatus, the operation load in the ECU for excluding a front lateral side object with a low possibility to collide with the self-vehicle from being a target of the collision avoidance assist can be reduced still further.

Fifth Embodiment

Hereafter, a driving assist apparatus according to a fifth embodiment of the present invention (which may be referred to as a "fifth apparatus" hereafter.) will be explained, referring to drawings.

As mentioned above, in the first apparatus to the fourth apparatus, the grade separation judging part which the collision avoidance assist control means comprises judges whether the positional relation between the front side object and the front lateral side object fulfills a predetermined condition or not based on the front side object information and the front lateral side object information. Then, when the positional relation between the front side object and the front lateral side object is judged to fulfill the predetermined condition, the front lateral side object course is judged to be the grade separation course.

The above-mentioned "predetermined condition" is that the front lateral side object course and the self-vehicle course are judged not to intersect with each other in a three-dimensional space including the vertical direction and two directions in a plane including a road surface on which the self-vehicle is running, for example. It can be said that such a predetermined condition is that a possibility that the front side object and the front lateral side object may collide with each other when it is presumed that both the front side object and the front lateral side object are running on a plane located in the same height in the vertical direction is judged to be high, for example.

Therefore, the fifth apparatus is any one of the above-mentioned first to fourth apparatuses, characterized in that the collision avoidance assist control means judges that the positional relation between the front side object and the front lateral side object fulfills the predetermined condition when a front side object course that is a moving course of the front side object calculated based on the front side object information and the front lateral side object course intersect with each other in a normal projection plane to a plane including a road surface.

Figure 7:
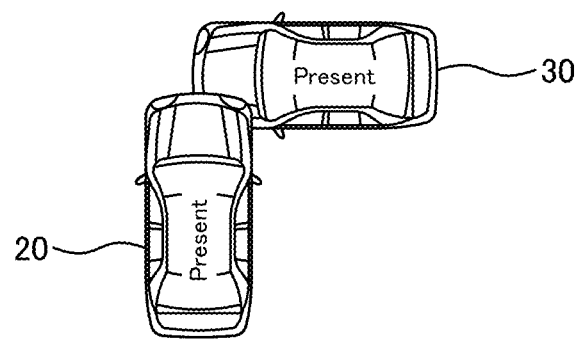
FIG. 7 is a schematic view for showing a state where a front side object and a front lateral side object exist in a crossing of a front side object course and a front lateral side object course in a normal projection plane to a plane including a road surface at a certain time (present).

FIG. 7 is a schematic view for showing a state where the front side object and the front lateral side object exist in a crossing of the front side object course and the front lateral side object course in a normal projection plane to a plane including a road surface at a certain time (present). As exemplified in FIG. 7, the front side object 20 and the front lateral side object 30 exist at a position where it appears that they have collided (overlapped) with each other in a planar view. A fact that the front side object 20 and the front lateral side object 30 can nevertheless advance along the respective moving courses means that the front side object 20 and the front lateral side object 30 can pass each other at different positions in the vertical direction without colliding with each other at the crossing of the front side object course and the front lateral side object course at least. Therefore, it can be judged that the self-vehicle running behind the front side object can also pass the front lateral side object 30 without colliding with the front lateral side object 30. Accordingly, the front lateral side object is judged not to be the collision risk object to be excluded from being a target of the collision avoidance assist.

Figure 8:
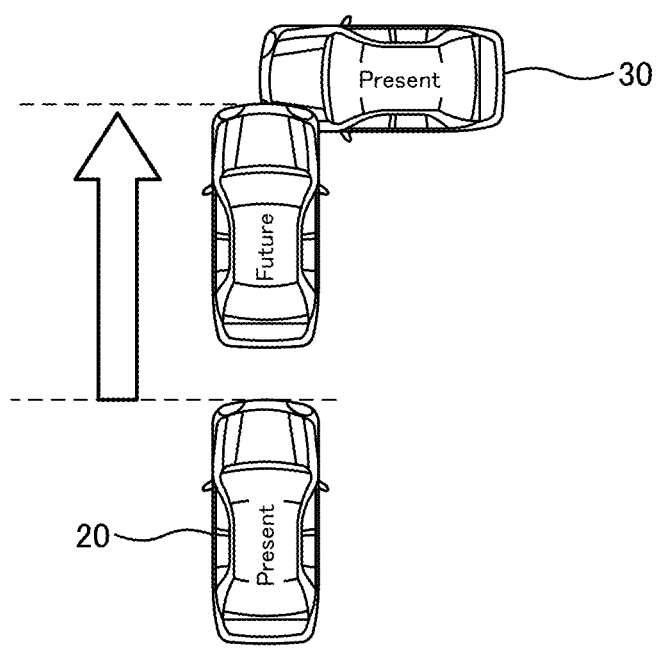
FIG. 8 is a schematic view for exemplifying a state where a front side object and a front lateral side object exist in the vicinity of a crossing of a front side object course and a front lateral side object course in a normal projection plane to a plane including a road surface at a certain time (present).

FIG. 8 is a schematic view for exemplifying a state where a front side object and a front lateral side object exist in the vicinity of a crossing of a front side object course and a front lateral side object course in a normal projection plane to a plane including a road surface at a certain time (present). In the state exemplified in FIG. 8, unlike the state exemplified in FIG. 7, although the front lateral side object 30 has arrived at the crossing, the front side object 20 exists at a position before the crossing and both do not overlap each other. However, as shown by an outlined arrow, the front side object 20 will arrive at the crossing before long. Under the present circumstances, depending on the speed of the front lateral side object 30, there is a possibility that the front side object 20 and the front lateral side object 30 may overlap with each other at the crossing of the front side object course and the front lateral side object course in the normal projection plane to the plane including the road surface. A fact that the front side object 20 and the front lateral side object 30 can nevertheless advance along the respective moving courses means that the front side object 20 and the front lateral side object 30 can pass each other at different positions in the vertical direction without colliding with each other at the crossing of the front side object course and the front lateral side object course at least. Therefore, it can be judged that the self-vehicle running behind the front side object can also pass the front lateral side object 30 without colliding with the front lateral side object 30. Accordingly, the front lateral side object is judged not to be the collision risk object and excluded from being a target of the collision avoidance assist. The maximum of the distance (corresponding to the length of the outlined arrow) from the crossing of the front side object 20 to be a target of the judgment as mentioned above can be properly set based on the speed of the front side object 20, etc., for example.

Figure 9:
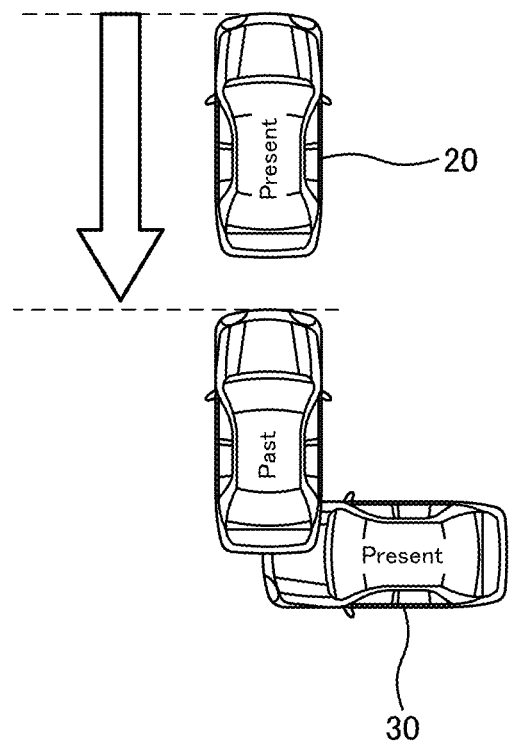
FIG. 9 is a schematic view for exemplifying another state where a front side object and a front lateral side object exist in the vicinity of a crossing of a front side object course and a front lateral side object course in a normal projection plane to a plane including a road surface at a certain time (present).

FIG. 9 is a schematic view for exemplifying another state where a front side object and a front lateral side object exist in the vicinity of a crossing of a front side object course and a front lateral side object course in a normal projection plane to a plane including a road surface at a certain time (present). In the state exemplified in FIG. 9, unlike the state exemplified in FIG. 7, although the front lateral side object 30 has arrived at the crossing, the front side object 20 already exists at a position past the crossing and both do not overlap each other. However, as shown by an outlined arrow, the front side object 20 existed at the crossing in the past. Under the present circumstances, depending on the speed of the front lateral side object 30, there is a possibility that the front side object 20 and the front lateral side object 30 may have overlapped with each other at the crossing of the front side object course and the front lateral side object course in the normal projection plane to the plane including the road surface. A fact that the front side object 20 and the front lateral side object 30 could nevertheless advance along the respective moving courses means that the front side object 20 and the front lateral side object 30 could pass each other at different positions in the vertical direction without colliding with each other at the crossing of the front side object course and the front lateral side object course at least. Therefore, it can be judged that the self-vehicle running behind the front side object can also pass the front lateral side object 30 without colliding with the front lateral side object 30. Accordingly, the front lateral side object is judged not to be the collision risk object and excluded from being a target of the collision avoidance assist. The maximum of the distance (corresponding to the length of the outlined arrow) from the crossing of the front side object 20 to be a target of the judgment as mentioned above can be properly set based on the speed of the front side object 20, etc., for example.

As mentioned above, in FIG. 7 to FIG. 9, states where the front side object 20 and the front lateral side object 30 overlap with each other in a planar view in three cases where the front side object 20 exists at positions in the past, the present and the future while the front lateral side object 30 is fixed at the position in the present are exemplified, respectively. However, also as for the front lateral side object 30, it is necessary to take into consideration not only a case where front lateral side object 30 exists at a position in the present, but also cases where front lateral side object 30 exists at positions in the past, the present and the future, similarly to the front side object 20.

Figure 10:
FIG. 10 is a schematic view for exemplifying states where a front side object and a front lateral side object overlap with each other in a planar view in nine cases where both of the front side object and the front lateral side object exist at positions in the past, the present and the future, respectively.

FIG. 10 is a schematic view for exemplifying states where a front side object and a front lateral side object overlap with each other in a planar view in nine cases (a) to (i) where both of the front side object and the front lateral side object exist at positions in the past, the present and the future, respectively. (a), (b) and (c) correspond to the above-mentioned FIG. 7, FIG. 8 and FIG. 9, respectively. Moreover, (d), (e) and (f) exemplify cases where the front side object 20 which exists at the positions in the past and the future and the front lateral side object 30 which exists at the positions in the future overlap with each other. Furthermore, (g), (h) and (i) exemplify cases where the front side object 20 which exists at the positions in the past and the future and the front lateral side object 30 which exists at the position in the past overlap with each other.

As mentioned above, depending on positions and speeds of the front side object and the front lateral side object, even if the front side object and the front lateral side object do not exist at a position where the front side object and the front lateral side object overlap with each other in a planar view at a certain time (present), there is a possibility that the front side object and he front lateral side object may exist at a position where the front side object and the front lateral side object overlap with each other in a planar view in the future or the past. For this reason, in the fifth apparatus, when the front side object course and the front lateral side object course intersect with each other in a normal projection plane to a plane including a road surface, it is judged that the positional relation between the front side object and the front lateral side object fulfills a predetermined condition, and it is judged that the front lateral side object course is the grade separation course. Namely, it can be judged that a possibility that the front lateral side object which exists in the front lateral side object course may collide with the self-vehicle is low. Therefore, the front lateral side object which exists in the front lateral side object course is judged not to be the collision risk object, and excluded from being a target of the collision avoidance assist. As a result, in accordance with the fifth apparatus, for example, issuance of an unnecessary alarm and/or execution of unnecessary automatic braking and/or automatic steering due to execution of unnecessary collision avoidance assist can be reduced more effectively.

By the way, in the fifth apparatus, as mentioned above, when a front side object and a front lateral side object may exist at a position where either one of the objects and the other object which exist at positions in the future or the past overlap with each other in a planar view even if the front side object and the front lateral side object do not exist at a position where they overlap with each other in a planar view in a certain time (present), the front lateral side object is excluded from being a target of the collision avoidance assist. However, from a viewpoint of preventing a front lateral side object from being excessively excluded from being a target of the collision avoidance assist, it is desirable that the front lateral side object is excluded from being a target of the collision avoidance assist only when it is judged that the front side object and the front lateral side object exist simultaneously at the crossing of the front side object course and the front lateral side object course in a planar view.

Therefore, in the fifth apparatus according to a preferred aspect, the collision avoidance assist control means may be configured so as to judge that the positional relation between the front side object and the front lateral side object fulfills the predetermined condition when the front side object and the front lateral side object exist simultaneously at a crossing of the front side object course and the front lateral side object course in the normal projection plane to a plane including the road surface.

FIG. 10 is referred to again here. Among the nine cases (a) to (i), in the three cases (a), (e) and (i), both the front side object and the front lateral side object exist at the crossing of the front side object course and the front lateral side object course in a planar view at the same time points in the present, the future and the past, respectively. On the other hand, among the nine cases (a) to (i), in the six cases other than the cases (a), (e) and (i), any of the front side object and the front lateral side object may exist at the crossing of the front side object course and front lateral side object course in a planar view at different time points in the future or the past.

Therefore, among the nine cases (a) to (i), the cases for which it is judged that the positional relation between the front side object and the front lateral side object fulfills the predetermined condition are the three cases (a), (e) and (i) corresponding to the cases where it is judged that the front side object and the front lateral side object exist simultaneously at the crossing of the front side object course and the front lateral side object course in the normal projection plane to a plane including the road surface. Namely, in accordance with the fifth apparatus according to a preferred aspect, the front lateral side object can be prevented from being excessively excluded from being a target of the collision avoidance assist.

Sixth Embodiment

Hereafter, a driving assist apparatus according to a sixth embodiment of the present invention (which may be referred to as a "sixth apparatus" hereafter.) will be explained, referring to drawings.

As mentioned above, in the first apparatus to the fifth apparatus, when the positional relation between the front side object and the front lateral side object is judged to fulfill the predetermined condition, the front lateral side object course that is the moving course of the front lateral side object is calculated based on the front lateral side object information. Although the positional relation among the self-vehicle, the front side object and the front lateral side object changes every moment, since the collision risk exclusion routine is repeatedly carried out with a predetermined short time interval (for example, 0.05 second) as mentioned above, the front lateral side object course can be calculated based on the front lateral side object information on each occasion, and thereby the front lateral side object course can be updated.

However, since a time period required for the front side object and the front lateral side object to pass each other is very short, a possibility that the front lateral side object course may change largely within the time period is low. Therefore, in the judgment whether the front lateral side object should be excluded from being a target of the collision avoidance assist or not, once the front lateral side object course has been calculated, the front lateral side object course may be corrected according to movement of the self-vehicle, rather than calculating the front lateral side object course whenever the collision risk exclusion routine is carried out.

Therefore, the sixth apparatus is any one of the above-mentioned first to fifth apparatuses characterized in that the grade separation judging part carries out front lateral side object course update processing that is processing in which the front lateral side object course calculated for the front lateral side object is updated based on a speed of the self-vehicle, and the collision risk exclusion judging part carries out the collision risk exclusion processing for the front lateral side object when the front lateral side object course updated by the front lateral side object course update processing lies in front of the self-vehicle and the front lateral side object exists in the updated front lateral side object course.

The front lateral side object course update processing that is processing in which the front lateral side object course calculated for the front lateral side object is updated based on a speed of the self-vehicle in the sixth apparatus means that parallel translation of the front lateral side object course in a coordinate system with a position of the self-vehicle as an origin according to the amount of movement of the self-vehicle obtained based on a length of an execution cycle of the collision risk exclusion routine and a speed of the self-vehicle, etc., for example.

Moreover, when the updated front lateral side object course exists behind a position of the self-vehicle, it is not necessary to avoid a collision of an object which exist in the front lateral side object course and the self-vehicle. Therefore, only when the updated front lateral side object course lies in front of (ahead of) the self-vehicle, the collision risk exclusion processing is carried out for the front lateral side object which exists in the front lateral side object course.

Figure 11:
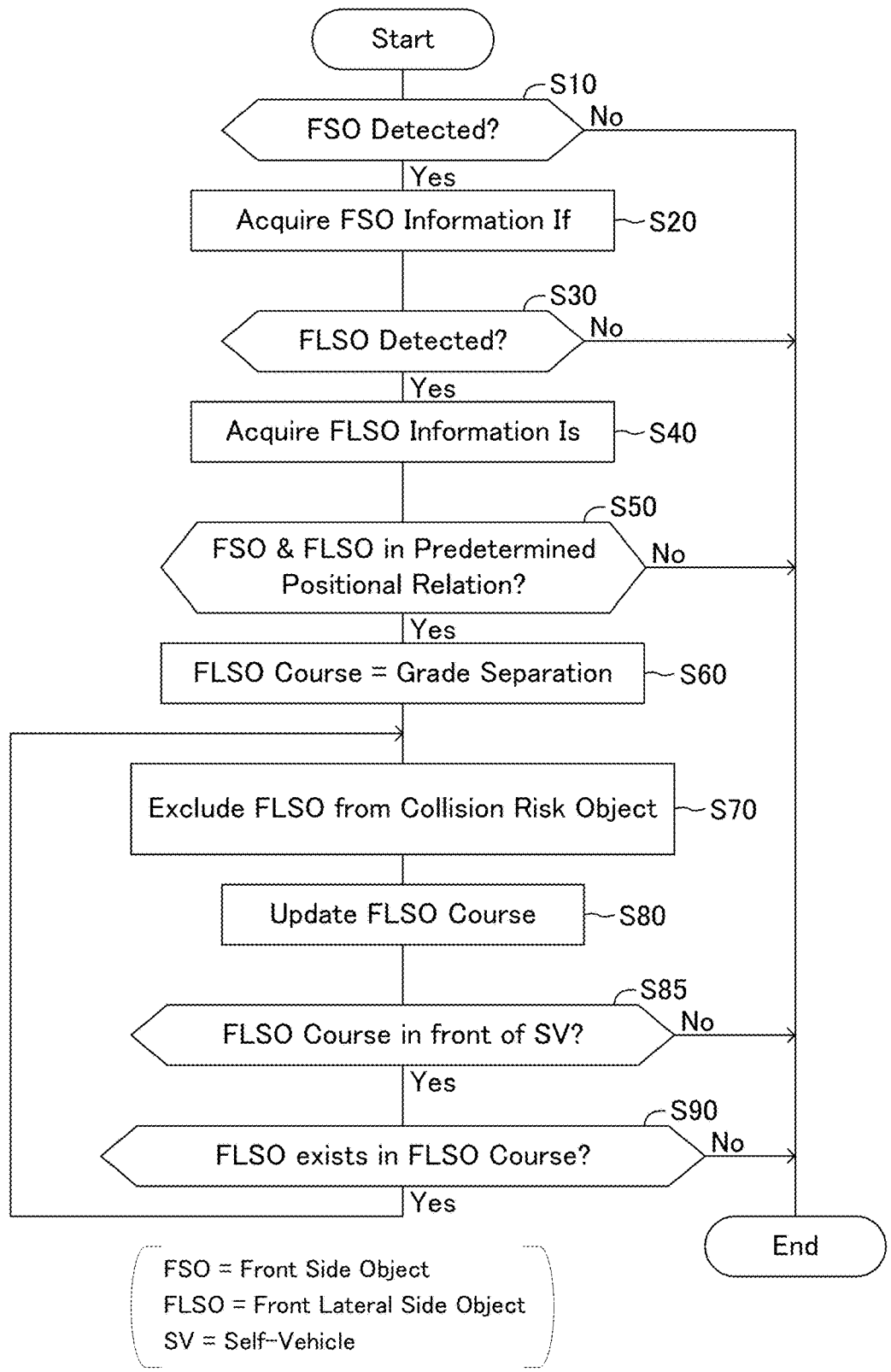
FIG. 11 is a flow chart for showing an example of a flow of various processing in a collision risk exclusion routine including grade separation course judging processing and collision risk exclusion processing which are carried out in a driving assist apparatus according to a sixth embodiment of the present invention (sixth apparatus).

FIG. 11 is a flow chart for showing an example of a flow of various processing in a collision risk exclusion routine including grade separation course judging processing and collision risk exclusion processing which are carried out in the sixth apparatus. The flow chart exemplified in FIG. 11 is the same as the flow chart exemplified in FIG. 4, except for the point that Step S80 in which the front lateral side object course is updated, Step S85 in which it is judged whether the updated front lateral side object course is in front of (ahead of) the self-vehicle or not, and Step S90 in which it is judged whether the front lateral side object exists in the updated front lateral side object course or not are added after Step S70 in which the collision risk exclusion processing is carried out.

Namely, in the collision risk exclusion routine carried out in the sixth apparatus, which is expressed by the flow chart exemplified in FIG. 11, the front lateral side object course is updated in Step S80 after the front lateral side object existing in the front lateral side object course which was judged to be the grade separation course in Step S60 is excluded from the collision risk object. Then, in the next Step S85, it is judged whether the updated front lateral side object course is in front of the self-vehicle or not. In other words, it is judged whether the self-vehicle has already passed (crossed) the front lateral side object course or not in Step S85.

When the updated front lateral side object course is in front of the self-vehicle (Step S85: Yes), it is judged whether the front lateral side object exists in the updated front lateral side object course or not in the next Step S90. When the front lateral side object exists in the updated front lateral side object course (Step S90: Yes), processing returns to the above-mentioned Step S70, the front lateral side object existing in the front lateral side object course which was judged to be the grade separation course in Step S60 is excluded from the collision risk object, and processing after Step S80 is carried out repeatedly.

When a judgment result in any of Step S85 in which it is judged whether the updated front lateral side object course is in front of (ahead of) the self-vehicle or not and Step S90 in which it is judged whether the front lateral side object exists in the updated front lateral side object course or not is "No", the collision risk exclusion routine is once ended at that time point.

In the sixth apparatus, as mentioned above, the grade separation judging part is configured so as to update the front lateral side object course calculated for the front lateral side object based on the speed of the self-vehicle. Therefore, in accordance with the sixth apparatus, as compared with a case where the front lateral side object course is calculated based on the front lateral side object information whenever the collision risk exclusion routine is carried out, the operation load in the ECU for updating the front lateral side object course can be reduced.

Seventh Embodiment

Hereafter, a driving assist apparatus according to a seventh embodiment of the present invention (which may be referred to as a "seventh apparatus" hereafter.) will be explained, referring to drawings.

As mentioned above, in the first apparatus to the sixth apparatus, when the positional relation between the front side object and the front lateral side object is judged to fulfill the predetermined condition based on the front side object information and the front lateral side object information, the front lateral side object course is judged to be the grade separation course. As mentioned above, the front lateral side object course is a moving course of the front lateral side object calculated based on the front lateral side object information. There is a possibility that the front lateral side object course may not be strictly straight. Therefore, the operation load in the ECU may become excessive when trying to calculate the front lateral side object course which accurately coincides with an actual moving course of the front lateral side object based on the front lateral side object information. On the other hand, since a time period required for the front side object and the front lateral side object to pass each other is very short as mentioned above, even when the front lateral side object course is regarded as a straight line, a gap from an actual moving course of the front lateral side object is small.

Therefore, the seventh apparatus is any one of the above-mentioned first to sixth apparatuses, characterized in that the grade separation judging part calculates the front lateral side object course as a straight line.

FIG. 12 is a schematic view for explaining an example of a procedure along which a grade separation judging part which a collision avoidance assist control means comprises calculates a front lateral side object course that is a moving course of a front lateral side object, as a straight line, based on a position, a speed and a running direction of the front lateral side object acquired as front lateral side object information by a second object information acquisition means. The front lateral side object 30 exemplified in FIG. 12 is obliquely (diagonally) crossing in the front side of the self-vehicle toward a left backward side from a right forward side with respect to the self-vehicle which is not shown. In the Y-X coordinate system in which a position of the self-vehicle is an origin (black round mark), a direction to a left side from a right side of the self-vehicle is a positive direction of a Y-axis, and a running direction of the self-vehicle is a positive direction of an X-axis, coordinates which indicate a position of the front lateral side object 30 are (Y, X). The Y-axis component and X-axis component of a speed to the road surface (ground speed) V (an arrow in a broken line) of the front lateral side object 30 are Vy and Vx, respectively (arrows in a solid line). These pieces of information are repeatedly acquired as front lateral side object information by the second object information acquisition means, such as a front lateral side radar, for example, with a short predetermined time interval (for example, 0.05 second).

An example of a procedure along which a numerical expression representing the front lateral side object course is calculated as a linear expression by regarding the front lateral side object course as a straight line based on the front lateral side object information (Y, X, Vy and Vx) acquired as mentioned above will be shown below. When a gradient of the above-mentioned linear expression is set as "a" and an X-axis intercept is set as "b" in a case where the Y-axis is set as a horizontal axis and the X-axis is set as a vertical axis, the coordinates (Y, X) of the front lateral side object 30 satisfy a relation expressed by the following formula (1).

$$X = Y*a + b \quad (1)$$

Thereafter, the coordinates (Y, X) of the front lateral side object 30 at a time point when a predetermined time period Δt has passed satisfy a relation expressed by the following formula (2).

$$X + Vx*\Delta t = (Y + Vy*\Delta t)*a + b \quad (2)$$

Since the following formula (3) is obtained by dividing both members of a formula obtained as a result of subtraction of both members of the formula (1) from both members of the formula (2) by Δt, it is found that the gradient a of the linear expression which represents the front lateral side object course can be obtained by the following formula (4).

$$Vx=Vy*a \quad (3)$$

$$a=Vx/Vy \quad (4)$$

Since the following formula (5) is obtained by introducing the formula (4) to the formula (1), it is found that the intercept b of the linear expression which represents the front lateral side object course can be obtained by the following formula (6).

$$X=Y*(Vx/Vy)+b \quad (5)$$

$$b=X-Y*(Vx/Vy) \quad (6)$$

As mentioned above, in the seventh apparatus, a linear expression which represents the front lateral side object course can be conveniently calculated based on the front lateral side object information (Y, X, Vy and Vx) acquired by the second object information acquisition means. Namely, in accordance with the seventh apparatus, since the grade separation judging part is configured so as to calculate the front lateral side object course as a straight line, the operation load in the ECU for calculating the front lateral side object course can be reduced.

In addition, when the grade separation judging part is configured so as to regard the front lateral side object course as a straight line and calculate a formula which represents the front lateral side object course as a linear expression, it is desirable that the grade separation judging part is configured so as to update the front lateral side object course calculated for the front lateral side object based on the speed of the self-vehicle as in the case of the above-mentioned sixth apparatus.

Therefore, in the seventh apparatus according to a preferred aspect, the grade separation judging part may be configured so as to update the front lateral side object course by subtracting a value obtained based on a speed of the self-vehicle and an operation cycle from a value of an intercept in an axis corresponding to a running direction of the self-vehicle of a linear expression representing the front lateral side object course in a coordinate system in which a position of the self-vehicle is an origin and the running direction of the self-vehicle and a direction perpendicular to the running direction of the self-vehicle are coordinate axes.

For example, when the front lateral side object course corresponding to the ground speed V (arrow in a broken line) of the front lateral side object 30 exemplified in FIG. 12 can be represented by the formula (1) (X=Y*a+b) which is a linear expression, in the seventh apparatus according to a preferred aspect, the front lateral side object course is updated by subtracting a value obtained based on the speed and the operation cycle from a value of the intercept b of the formula (1). The "value obtained based on the speed and the operation cycle" is the amount of movement of the self-vehicle in the operation cycle obtained by multiplication of the speed of the self-vehicle and the operation cycle, for example.

Moreover, in the above, when the value of the intercept b becomes zero or less in association with the update of the front lateral side object course, since it is judged that the self-vehicle has passed the intended front lateral side object course, the front lateral side object corresponding to the front lateral side object course can be excluded from being a target of the grade separation course judging processing carried out by the grade separation judging part which the collision avoidance assist control means comprises.

As mentioned above, in the seventh apparatus according to a preferred aspect, while a linear expression which represents the front lateral side object course can be conveniently calculated based on the front lateral side object information, the linear expression can be updated conveniently. Therefore, in accordance with the seventh apparatus according to a preferred aspect, not only the operation load in the ECU for calculating the front lateral side object course, but also the operation load in the ECU for updating the front lateral side object course can be reduced.

Although some embodiments which have specific configurations have been explained, sometimes referring to accompanying drawings, as the above, for the purpose of explaining the present invention, it should not be interpreted that the scope of the present invention is limited to these exemplary embodiments, and it is needless to say that modifications can be properly added within the limits of the matter described in the claims and the specification. For example, the present invention can be applied to an autonomous vehicle.

REFERENCE SIGNS LIST

10: Self-Vehicle
20: Front Side Object
30, 31: Front Lateral Side Object
　30a, 30b, 30c: Carriage of Monorail
101: Driving Assist Apparatus (First Apparatus)
110: First Object Information Acquisition Means
120: Second Object Information Acquisition Means
130: Collision Avoidance Assist Control Means
　131: Grade Separation Judging Part
　132: Collision Risk Exclusion Judging Part

The invention claimed is:
1. A driving assist apparatus comprising:
a first object information acquisition means to acquire first information that is information about an object which exists in a front side region of a self-vehicle, the first information being front side object information about a position, a speed and a running direction only in a planar view of a front side object existing in front of said self-vehicle;
a second object information acquisition means to acquire second information that is information about an object which exists in a front lateral side region of said self-vehicle, the second information being front lateral side object information about a position, a speed and a running direction only in said planar view of a front lateral side object existing in a front lateral side range that is a predetermined range located in a lateral side with respect to a running direction of said self-vehicle;
a collision avoidance assist control means to perform a collision avoidance assist that is an assist for avoiding a collision of said self-vehicle and a collision risk object that is an object judged to be collidable with said self-vehicle based on said first information and said second information when said collision risk object is judged to exist, the object is judged to be collidable in a state in which a course of the self-vehicle and a course of the object intersect in a normal projection plane to a plane including a road surface in the planar view of the front side object and the planar view of the front lateral side object, wherein said collision avoidance assist control means comprises:
a grade separation judging part to carry out grade separation course judging processing that is processing in which a front lateral side object course that is a moving course of said front lateral side object calculated based on said front lateral side object information is judged to be a grade separation course that is a course which is away from a self-vehicle course that is a moving course of said self-vehicle in a vertical direction and does not intersect with said self-vehicle course when a positional relation between said front side object and said front lateral side object is judged to fulfill a predetermined condition based on said front side object information and said front lateral side object information; and
a collision risk exclusion judging part to carry out collision risk exclusion processing that is processing in which said front lateral side object existing in said front lateral side object course judged to be said grade separation course by said grade separation judging part is not judged to be said collision risk object,
wherein said collision risk exclusion judging part only judges that said front lateral side object exists in said grade separation course when:
in a two-dimensional coordinate system corresponding only to said planar view, an absolute value of a difference between a calculated coordinate value that is a coordinate value of said front lateral side object in one coordinate axis calculated by applying a coordinate value of said front lateral side object in the other coordinate axis included in said front lateral side object information acquired by said second object information acquisition means to said front lateral side object course calculated by said grade separation judging part and a detected coordinate value that is an actual coordinate value of said front lateral side object in said one coordinate axis included in said front lateral side object information acquired by said second object information acquisition means is equal to or less than a predetermined threshold value, and
an absolute value of a difference between a calculated angle that is an inclination of said front lateral side object course at coordinates of said front lateral side object in said two-dimensional coordinate system and a detected angle that is an inclination corresponding to a running direction of said front lateral side object acquired by said second object information acquisition means is equal to or less than a predetermined threshold value.

2. The driving assist apparatus according to claim 1, wherein
said collision avoidance assist control means carries out said grade separation course judging processing and said collision risk exclusion processing only when said self-vehicle is judged to be in a straight running state.

3. The driving assist apparatus according to claim 2, wherein
said collision avoidance assist control means judges that said self-vehicle is in a straight running state when a curvature radius of said self-vehicle course is larger than a predetermined threshold value.

4. The driving assist apparatus according to claim 1, wherein
said first object information acquisition means judges an object which exists in front of said self-vehicle and is moving in the same direction as the running direction of said self-vehicle to be said front side object.

5. The driving assist apparatus according to claim 2, wherein
said first object information acquisition means judges an object which exists in front of said self-vehicle and is moving in the same direction as the running direction of said self-vehicle, as well as has a history that frequency of a state where a value obtained by subtracting a speed of said self-vehicle from a speed of the object in the running direction of said self-vehicle calculated based on said first information is larger than a predetermined threshold value within a time period in which a predetermined time has passed until the present time is equal to or more than a predetermined number of times, to be said front side object.

6. The driving assist apparatus according to claim 1, wherein
said second object information acquisition means judges an object as said front lateral side object, when the object exists in said front lateral side range and is approaching said self-vehicle, a speed component of the object in a direction perpendicular to the running direction of said self-vehicle is larger than a predetermined threshold value, an angle between the direction perpendicular to the running direction of said self-vehicle and a running direction of the object is a predetermined threshold value or less, and a distance between the object and said self-vehicle in the direction perpendicular to the running direction of said self-vehicle is larger than a predetermined threshold value.

7. The driving assist apparatus according to claim 1, wherein
said collision avoidance assist control means judges that the positional relation between said front side object and said front lateral side object fulfills the predetermined condition when a front side object course that is a moving course of said front side object calculated based on said front side object information and said front lateral side object course intersect with each other in the normal projection plane.

8. The driving assist apparatus according to claim 7, wherein
said collision avoidance assist control means judges that the positional relation between said front side object and said front lateral side object fulfills the predetermined condition when said front side object and said front lateral side object exist simultaneously at a crossing of said front side object course and said front lateral side object course in said normal projection plane.

9. The driving assist apparatus according to claim 1, wherein
said grade separation judging part carries out front lateral side object course update processing that is processing in which said front lateral side object course calculated for said front lateral side object is updated based on a speed of said self-vehicle, and
said collision risk exclusion judging part carries out said collision risk exclusion processing for said front lateral side object when said front lateral side object course updated by said front lateral side object course update processing lies in front of said self-vehicle and the front lateral side object exists in the updated front lateral side object course.

10. The driving assist apparatus according to claim 1, wherein said grade separation judging part calculates said front lateral side object course as a straight line.

11. The driving assist apparatus according to claim 10, wherein said grade separation judging part updates said front lateral side object course by subtracting a value obtained based on a speed of said self-vehicle and an operation cycle from a value of an intercept in an axis corresponding to a running direction of said self-vehicle of a linear expression representing said front lateral side object course in a coordinate system in which a position of the self-vehicle is an origin and the running direction of said self-vehicle and a direction perpendicular to the running direction of said self-vehicle are coordinate axes.

* * * * *